United States Patent [19]
Orchard

[11] 4,205,415
[45] Jun. 3, 1980

[54] FOOD PRODUCT EXTRUSION APPARATUS

[75] Inventor: Lewis P. Orchard, Berlin, N.J.

[73] Assignee: RCA Corporation, New York, N.Y.

[21] Appl. No.: 832,461

[22] Filed: Sep. 12, 1977

Related U.S. Application Data

[60] Division of Ser. No. 690,903, May 28, 1976, Pat. No. 4,068,008, which is a continuation-in-part of Ser. No. 598,580, Jul. 24, 1975, abandoned, which is a continuation of Ser. No. 454,159, Mar. 25, 1974, abandoned.

[30] Foreign Application Priority Data

Jan. 28, 1974 [GB] United Kingdom .............. 03802/74

[51] Int. Cl.² .............................................. A22C 7/00
[52] U.S. Cl. ......................................... 17/32; 425/298
[58] Field of Search ............. 17/32; 83/411 R, 411 A, 83/409.2; 425/289, 298

[56] References Cited

U.S. PATENT DOCUMENTS

| 2,085,108 | 6/1937 | Louisot et al. .................. 17/32 UX |
| 2,580,008 | 12/1951 | Elsaesser ................................. 17/32 |
| 2,793,394 | 5/1957 | Menkens et al. .......................... 17/32 |
| 3,727,308 | 4/1973 | Ross .................................. 425/202 X |
| 3,777,600 | 12/1973 | Long et al. .................... 83/411 R X |

Primary Examiner—Willie G. Abercrombie
Attorney, Agent, or Firm—Samuel Cohen; William Squire

[57] ABSTRACT

A tapered nozzle slightly compresses a mass of ground frozen meat to form a cohesive mass while retaining the spaghetti-like shape of the ground strands to aerate the cohesive mass. A positive displacement pump forces the meat through a grinding plate and then through the nozzle to a rotating involute knife to form patties of frozen ground meat in a continuous process.

12 Claims, 8 Drawing Figures

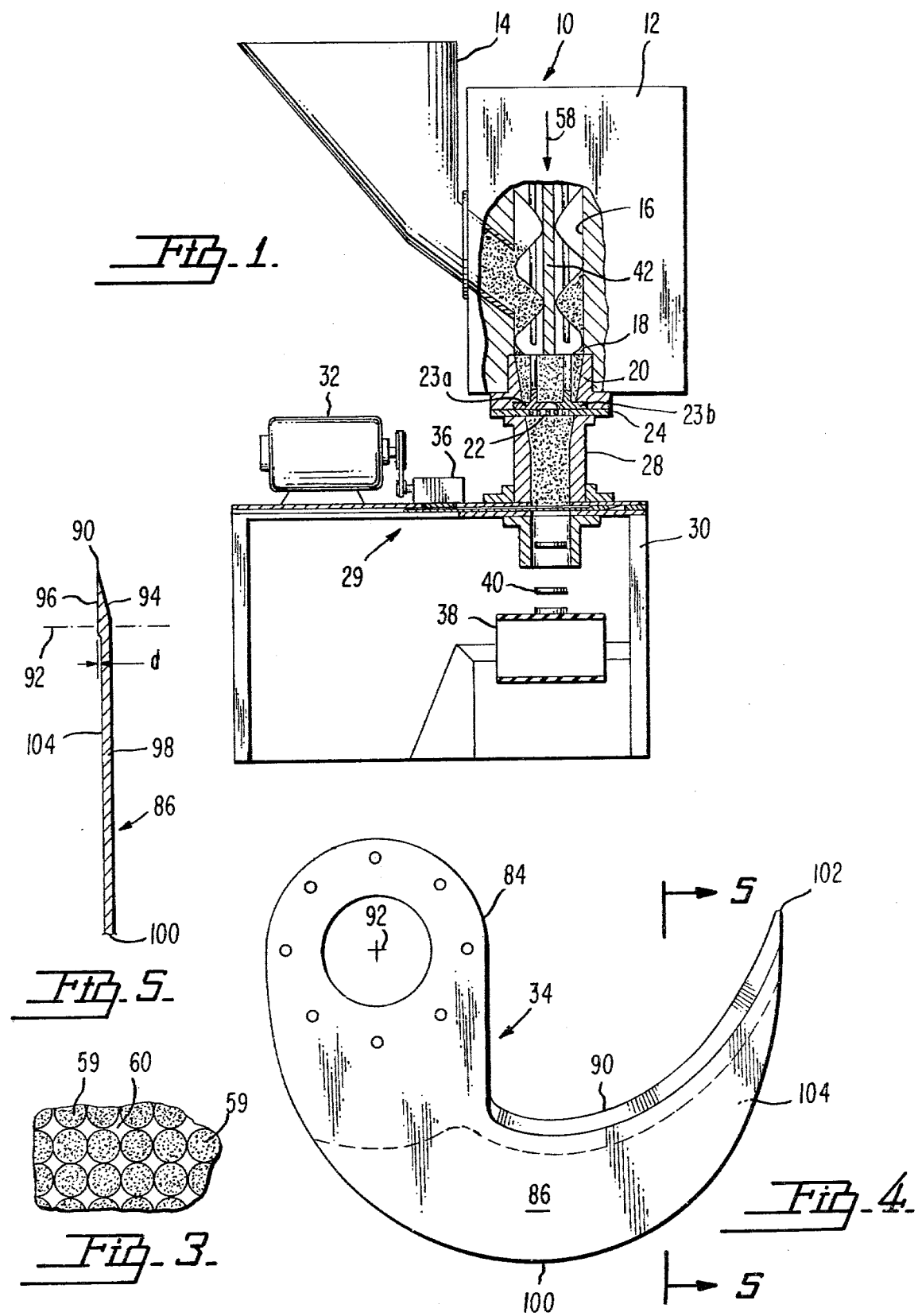

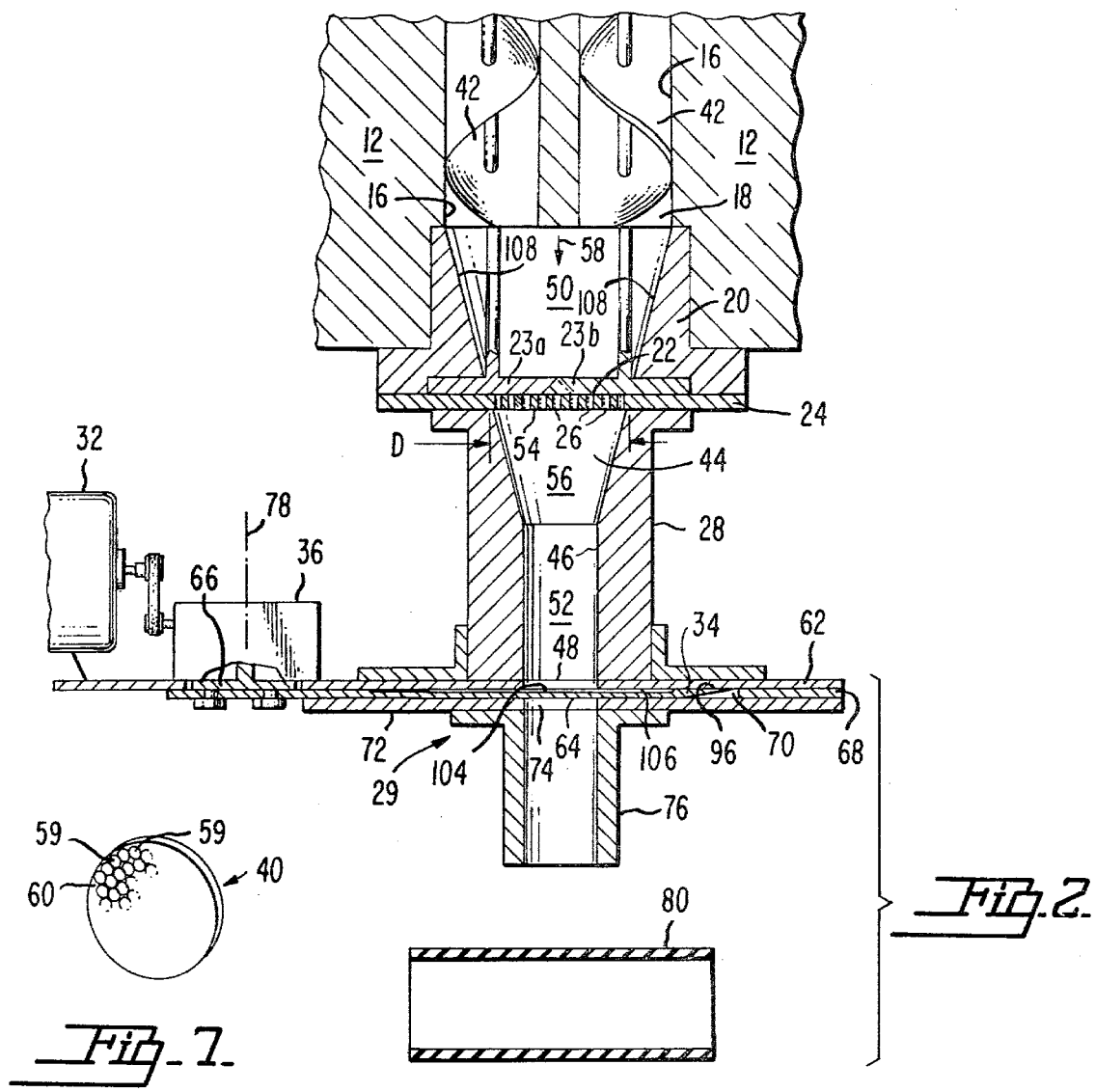
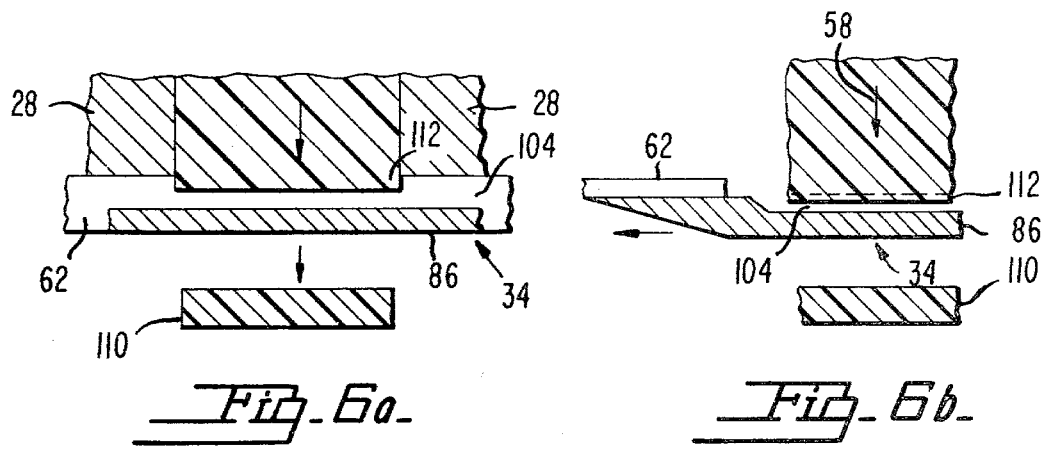

FOOD PRODUCT EXTRUSION APPARATUS

This is a division of application Ser. No. 690,903, filed May 28, 1976, now U.S. Pat. No. 4,068,008, patented Jan. 10, 1978, which is a continuation-in-part application of application Ser. No. 598,580 filed July 24, 1975, abandoned, which is a continuation of application Ser. No. 454,159, filed Mar. 25, 1974, abandoned.

BACKGROUND OF THE INVENTION

In the processing of chopped meat patties in the prepackaged frozen food industry, the meat is prefrozen in bulk form. The meat is ground while frozen and a meat pattie is formed of the frozen chopped meat which is then cooked prior to packaging and frozen in the cooked state.

The usual process in the industry for preparing the meat includes chipping or flaking the frozen bulk meat into a large mass of small frozen meat chips. These frozen chips are then processed through a conventional meat grinder. The meat is required to remain in the frozen state during this processing. After grinding, the frozen meat is formed into frozen chopped meat patties.

This forming process literally pounds the hard, frozen chopped meat into a preformed meat pattie cavity. The cavity is then rotated or otherwise diplaced to shear the packed meat within the cavity from the remainder of the extruded meat.

To thus pound the frozen meat into a compact tightly formed meat pattie produces great stress on the machinery and causes frequent breakdowns thereof. Additionally, the shearing action involved in forming the meat pattie produces a waste material known in the art as "ooze." This "ooze" material is a material that is not fit for either animal or human consumption. Thus, this process produces thousands of patties within a matter of hours and hundreds of pound of "ooze" material. Additionally, the pattie so formed has a finished cooked quality poorer than one should expect from the quality and grade of the raw product.

A further problem of the process is that the process needs to be continually monitored to ensure that none of the frozen meat thaws and remains within the machinery which thawing could cause the meat to spoil.

SUMMARY OF THE INVENTION

In accordance with the present invention an extrusion nozzle is provided for use with a solid food grinder of the type including a grinding plate having a plurality of spaced apertures extending in a first direction. The plate including the apertures has a first area transverse the first direction. Solely the apertures have a second area transverse of the first direction which is less than the first area.

The nozzle comprises a housing having a hollow core tapered in a second direction from a wider inlet port to a narrow portion disposed within the housing. The narrow portion extends to a discharge port. The inlet port has an area transverse the second direction of at least the same magnitude as the first area. The narrow portion has an area transverse the second direction of about the same magnitude as the second area. Means are provided for coupling the inlet port adjacent the grinding plate.

A feature of the invention includes extruding means having an inlet port and an outlet port, the outlet port being coupled to the grinding plate. The extruding means includes a pressure pump including a pumping chamber and drive means closely fitted within the chamber to prevent cavitation of the food when driven by the drive means to the outlet port.

A further feature of the invention includes a rotating knife mounted adjacent the discharge port of the nozzle for portioning the extruded product. The rotating knife has an involute cutting edge which edge slidably transverses the discharge port when the knife rotates. The knife includes a recess for receiving the mass of the extruded product. The recess of a given depth is disposed adjacent the cutting edge of the knife for receiving the end of the mass during the extrusion while the knife rotates to permit continuous extrusion during the portioning process.

A method of forming a cohesive mass of ground food having an adherent surface comprises the steps of grinding the food into a plurality of loose granular particles, and lightly compressing the particles together to form a cohesive-mass including air pockets disposed between the particles within the mass.

IN THE DRAWINGS

FIG. 1 is an elevational view of a machine constructed in accordance with an embodiment of the present invention, FIG. 2 is an enlarged elevational cross sectional view of the extrusion portion of the machine of FIg. 1 including an extrusion nozzle, FIG. 3 is an enlarged sectional view of a meat pattie formed by the machine of FIG. 1, FIG. 4 is an elevational view of a knife used with the apparatus of FIG. 1, FIG. 5 is a cross sectional view of the knife of FIG. 5 along lines 5—5, FIGS. 6a and 6b are sectional views of the extrusion nozzle and knife assembly useful in explaining the operation of the apparatus of FIG. 1, and FIG. 7 is a perspective sectional view of a meat pattie formed by the apparatus of FIG. 1.

DETAILED DESCRIPTION

In FIG. 1 extrusion apparatus 10 includes a positive displacement food pump 12. Pump 12 is the type of machine usually used in the manufacture of sausages, bologna, salami and similar type of food product. This produce is one wherein a highly compressed food product is forced, under pressure, into an elongated narrow casing to form a relatively hard elongated tubular mass of compressed food.

Such a machine is not ordinarily used in a food processing art to grind meat or the like. The grinding process is confined to a less sophisticated and cheaper apparatus using a well known auger and apertured grinding plate. However, in accordance with one feature of the present invention, a pump machine of the type described above is utilized to produce ground or chopped meat. One suitable pump machine is model Vemag 3000S manufactured for the Robert Reiser Co., Inc. of Boston, Mass.

Secured to machine or pump 12 is a hopper 14 which supplies by gravity chipped frozen meat or bulk thawed meat, as the case may be, to the pumping cavities 16 of machine 12. The pump of machine 12 includes in one form, twin pump screws 42 which are disposed within cavities 16 which together form an elongated cross section. The discharge ports 18 of pumping cavities 16 are coupled to an adapter 20. Adapter 20 converts the generally elongated pump cavities 16 to a generally circular or oblonged shaped cavity at the discharge end 22 of adapter 20. Secured to each of screws 42 in direct drive therewith are a pair of conventional cutters 23a and 23b. Cutters 23a and 23b each rotate in response to the rotation of the corresponding screw 42 for cutting up the meat prior to further extrusion in the direction 58. Sealingly secured to adapter 20 is a planar conventional grind plate 24 having a plurality of apertures 26 disposed therein. Sealingly connected to the other side of grind plate 24 opposite the discharge end 22 is nozzle 28 constructed in accordance with the present invention to be described in connection with FIG. 2. Nozzle 28 is connected to pattie forming assembly 29 mounted in table 30.

Assembly 29 includes a knife drive motor 32 which drives a rotating knife 34 (FIG. 2) by way of gear box 36. Patties are formed by assembly 29 by slicing the patties from the extrusion mass flowing from nozzle 28. Disposed directly beneath nozzle 28 is an endless conveyor belt assembly 38 which carries away patties 40 formed by the assembly 29. Machine 12 is a positive displacement pump having a pair of twin screws 42 closely fitted within the cavity 16 so as to provide a positive pressure on food particles disposed within the cavity 16. In effect, screws 42 act as pump gears rather than a mere conveying means such as a conventional auger. This positive pressure prevents what is known in the art as cavitation.

Generally in the meat grinding art an auger or screw is placed within an oversized cavity and the screw is rotated to force the meat product against an apertured plate at one end of the axially disposed screw. By packing the meat product into the auger, the screw action of the auger forces the meat past a revolving cutter against the aperture plate and thus forces the meat through the plate apertures. However, due to the loose tolerance existing between this auger and its corresponding cavity, the density of the meat forced against the aperture plate is not always uniform. Further, variations of back pressure in accordance with the amount of meat supplied to the auger may cause some of the meat to be displaced between the screw or auger blades and the auger cavity. When the meat remains stationary, as the auger rotates, it will tend to thaw and therefore will be subject to spoilage. The stationary disposition of the meat within the auger cavity as the auger rotates is known in this art as cavitation. As a result, the meat grinding process portion has been separate from the pattie forming process in the frozen food industry. That is, frozen meat is ground and then the ground frozen meat is separately supplied to the pattie forming apparatus.

However, as provided in accordance with a feature of the present invention, the use of a positive displacement pump prevents the occurrence of cavitation and permits the use of the grinding step as part of a continuous process in the manufacture of meat patties. This provides a marked improvement in the efficiency of the pattie forming process.

The pump 12 is disposed with the screws 42 oriented in a vertical direction with respect to the earth such that patties 40, when formed, drop by gravity to the conveyor belt 38. Suitable mounting means (not shown) are provided for mounting pump 12 in this orientation.

In FIG. 2 there is illustrated extrusion nozzle 28 constructed in accordance with the present invention. Nozzle 28 has a cavity 52 defined by an inlet port 44 which tapers to a narrower conduit portion 46 disposed within the nozzle 28. Narrow portion 46 has a uniform cross sectional area which continues to the discharge port 48 of nozzle 28 in the extrusion direction 58. The alignment of cavity 50 of adapter 20 and cavity 52 of nozzle 28 is preferably in the same direction 58. Suitable fastening means (not shown) connect nozzle 28 sealingly to aperture grind plate 24 and, in turn, sealingly connect grind plate 24 to adapter 20 and adapter 20 to machine 12 at cavities 16. As known to those skilled in the meat grinding art, plate 24 is commercially available in at least thicknesses of one-quarter and one-half inches in accordance with the number of apertures in the respective plate. For example, a one-quarter inch plate may have approximately 50–100 apertures while a one-half inch plate may have 500–900 apertures. The size of the aperture plate selected, of course, depends on whether miniature hamburgers in the order of about 1 or 2 square inches in transverse cross-section or meat loaf in the order of about 20 square inches in transverse cross-section are desired.

It will be further appreciated that the relatively thin aperture plate 24 minimizes mechanical rendering of the meat. In rendering, the fat in the meat migrates to the aperture walls forming a thick film inside the walls. Such rendering tends to reduce the otherwise natural adhesiveness of the raw meat at the surface of the strands.

Apertures 26 in plate 24 are disposed in a circular array having a diameter D. The transverse area of the circular plate including all apertures 26 within diameter D has a known area A. This area includes the cross sectional area $A_a$ of the apertures 26 and the cross sectional area of the intermediate portions 54 of plate 24 surrounding and defining apertures 26. Necessarily the total transverse area A of the intermediate portions 54 and apertures 26 is larger than the total combined transverse area $A_a$ of apertures 26 alone.

Inlet port 44 of nozzle 28 is provided with a transverse cross sectional area that is at least as great as the combined transverse cross sectional area of apertures 26 and the intermediate portions 54 comprising area A. The inlet port 44 tapers uniformly to the narrower transverse cross sectional area at portion 46 to provide laminar flow of the ground meat. The cross sectional area $A_d$ of narrower portion 46 is about the same magnitude as the transverse cross sectional area $A_a$ of apertures 26 within area A. The value of portion 46 area $A_d$ is preferably about 5% greater than the aperture area $A_a$ when processing meat.

When the strands 59 (FIG. 3) of chopped meat flowing through cavity 52 reach narrower nozzle portion 46, the strands remain substantially parallel to each other and contiguous. The area $A_d$ of portion 46 lightly compresses or squeezes the strands 59 together in a radial or lateral inward direction transverse the direction 58 forming a cohesive mass of all of the naturally adherent strands 59 within portion 46. However, the mass is not so tightly compressed by the tapering action as to remove all of the air pockets 60 (FIG. 3) disposed within the mass intermediate the various strands or destroy the strand-like configuration of the raw meat. This action is achieved by the relationship of area $A_d$ to area $A_a$ and the extruding forces in direction 58. These forces are not critical and can have any value sufficient to force the meat through apertures 26. Thus these forces may be produced by a hand auger, as well as a pump such as pump 12.

FIG. 3 is a partial enlarged sectional view of some of the strands 59 of chopped meat disposed within narrow portion 46 of nozzle 28. Each of the strands 59 is contiguous with the next adjacent strand, however, some air space 60 remains between the strands. Thus, while the strands have been compressed or directed together sufficiently to form a single cohesive mass and some deformation occurs, each of the strands are still readily identifiable in cross section in the raw state. It is thus apparent that plain, natural red meats of the type, for example, including steer, calf, lamb, pork and the like can be formed into a naturally adherent aerated mass. It should be further apparent that the strands are separately identifiable in the raw and cooked states without fibrous additives.

It will occur to those skilled in the meat processing art that such additives as grain, onions, eggs, and seasoning, individually or in any combination may be used to enhance the flavor of the product.

The extended length of narrow portion 46 disposed between tapered portion 56 and the discharge port 48 may be of any suitable magnitude as known in the extrusion art to provide an elongated mass of chopped meat having a substantially uniform cross section when discharged from nozzle 28. Nozzle 28 may be made of any suitable material but is preferably made of stainless steel.

The discharge port 48 of nozzle 28 is secured in a suitable manner to knife wear plate 62. Wear plate 62 is a planar plate of hardened metal which serves as a guide and coacting cutting surface for rotating knife 34. Wear plate 62 has a hole 64 of about the same transverse section area as area $A_d$ of portion 46 and is disposed adjacent the discharge port 48 to form a continuous conduit therewith. Wear plate 62 is secured to table 30 (FIG. 1) in a suitable manner (not shown).

All the elements including machine 12, adapter 20, plate 24, nozzle 28 and wear plate 62 are tightly secured together to prevent oozing of any of the meat product at the connected joints therebetween. Disposed adjacent wear plate 62 is rotating involute knife 34. Knife 34 is secured to gear box 36 at gear box output drive 66. A spacer ring 68 is secured around the periphery of circular wear plate 62 to form a knife rotating cavity 70. Knife cover plate 72 is secured to spacer ring 68 to enclose cavity 70. Knife 34 is disposed with the direction of rotation of the blade thereof normal to the extrusion direction 58. Cover plate 72 has a hole 74 which is aligned with hole 64 and cavity 52 and forms a continuous conduit therewith. Secured to a side of plate 72 opposite cavity 70 is safety housing 76 to protect personnel from being injured by rotating blade 34. Housing 76 is a hollow conduit fastened to cover plate 72. The conduit of housing 76 is also axially aligned with the extrusion direction 58. Knife drive 66 rotates about drive axis 78.

In describing the knife 34, reference is made to FIGS. 4 and 5, wherein knife 34 includes a mounting plate 84 and a blade 86 depending from the mounting plate. Blade 86 has a cutting edge 90 formed along an involute curve intersecting the axis of rotation 92 of knife 34. Cutting edge 90 is preferably provided as an inside edge of the blade. One face 94 of knife 34 tapers toward a second face 96 terminating in cutting edge 90. Face 96 is disposed normal to the axis of rotation 92 of knife 34. Face 94 terminates at blade surface 98 which extends to the non-cutting peripheral edge 100 of the blade 86.

Edge 100 commencing at blade end 102 follows a general convex curve to mounting plate 84. Blade 86 is machete-like in shape. Recess 104 is formed in blade 86 on the side thereof opposite blade surface 98. Recess 104 extends from face 96 to edge 100. Recess 104 has a predetermined depth d. Depth d is determined in conjunction with the angular rate of rotation of knife 34 and the feed rate of the cohesive mass flowing through the nozzle discharge port 48 in a manner to be explained. The size of the blade is determined in a conventional manner with respect to the size of the cross sectional area of discharge port 48 of nozzle 28 such that the cutting edge 90 extends transversely across discharge port 48 as knife 34 is rotated. Face 96 of blade 86 is disposed contiguous with cutting surface 106 on wear plate 62 as is known in the cutting tool art, (see FIG. 2).

In FIG. 2, recess 104 is disposed facing discharge port 48. Recess 104 serves to receive the extruded mass of lightly compressed extruded meat after face 96 passes through the meat. This operation will be explained in connection with FIGS. 6a and 6b.

In operation, screws 42 force with a positive pressure chipped frozen meat into cavity 50 of adapter 20. The inside walls 106 of cavity 50 are tapered from discharge port 18 of pump 12 to narrow discharge end 22 in a manner to provide a minimum of turbulence in the flow of the chipped meat to prevent cavitation thereof within cavity 50. This is important for the reason that should cavitation, that is stagnation of a portion of the meat, take place within cavity 50, that portion of meat will thaw and spoil. The meat under pressure is forced through conventional cutters 23a and 23b and thence through plate 24 forming a plurality of spaghetti-like strands 59 (FIG. 3) of meat. Cutters 23a and 23b, in cutting up the mass of meat just prior to entering apertures 26, prevent the clogging of apertures 26 in a conventional manner. The cut meat entering apertures 27 comprises a plurality of naturally adherent particles. The particles when forced through the apertures 26 are formed into the strand configuration.

The strands 59 are then directed together in laminar flow in the direction 58 by the tapered narrowing configuration of tapered portion 56 of nozzle 28. The spaghetti-like strands continue to flow through cavity 52 as a cohesive extruded mass having a plurality of air pockets 60 (FIG. 3) between adjacent strands within the mass. Nozzle portion 46 aligns the strands substantially parallel. The substantially parallel nature of the strands provides an elongated granular structure to the cohesive mass. The mass continues to flow toward knife 34. In the meantime knife 34 is rotating at a predetermined rate which is synchronized with the flow rate of the mass of extruded meat. The synchronism is such that the mass continues to flow at all times without backing up against blade 86.

In FIGS. 6a and 6b there is illustrated a severed meat pattie 110. Severed meat pattie 110 has an outer configuration determined largely by the shape of the extrusion nozzle 28 discharge port 48. Knife 34 is shown in a position where it has fully severed the meat pattie 110 with the blade 86 still blocking the passage way to the discharge port 48. Unless otherwise provided for, the meat would tend to be stalled at the discharge port until the blade 86 is rotated beyond the path of the extruded mass flow. This would cause an undesirable backing up of the mass, a non-uniform meat pattie and would unduly compress the meat eliminating the air pockets 60 (FIG. 3).

In the prior art machines, the feed of the extruded mass is usually made intermittent, that is the feeding is stopped for short periods of time, to prevent the undesirable backing up of the material during the pattie forming process. However, in accordance with the present invention the manufacture of the cohesive extruded mass is continuous by providing recess 104 in knife 34. By providing recess 104 directly behind face 96 of the rotating blade, the meat that is extruded continues to flow toward the rotating knife and is received by recess 104. This received portion 112 is the leading edge of the extruded mass which forms part of the next subsequent formed meat pattie. The depth of the recess (FIG. 5), the rate of rotation of the knife, the size of the knife and the feed rate of the cohesive mass of the meat are all predetermined in a conventional manner by well known principles.

It will be appreciated that at high mass production rates, for example 200 patties per minute, knife 34 rotates at 200 rpm and processes approximately 600 ounces of meat per minute through pump 12. At these rates, even the relatively small amount of meat that would be compressed against the blade 86 of knife 34, should recess 104 not be provided, would produce a relatively large backup of extruded meat within the nozzle 28 in a short period of time.

The provision of air pockets 60 and the substantially elongated granular structure of the meat pattie, as illustrated in FIG. 7, provides a meat pattie that is extremely tender and tasty. The juices, when cooked, tend to remain within the air pockets disposed within the meat pattie and the loose formation of the various spaghetti strands of extruded meat tend to remain tender as compared with meat patties formed by pounding and otherwise tight packing.

By the use of knife 34 as compared to the shearing action provided in prior art devices, virtually no ooze is produced. Knife 34 is sufficiently sharp to provide a clean cut of the pattie producing almost no waste. The ground meat, when frozen, is not an easy material to cut. As a result, the involute curve provided edge 90 of knife 34 (FIG. 4) provides a sliding action with respect to the meat pattie during the cutting process. This sliding action produces a cleaner cut than otherwise possible.

It should be understood that while the involute knife edge 90 is disposed on the interior curve of blade plate 86, an involute cutting edge may, in the alternative, be provided knife 34 at the exterior peripheral edge 100.

As the meat patties are severed, they fall by gravity onto conveyor 80 (FIG. 2) and are conveyed in the usual manner. By using the meat pump 12, adapter 20 in conjunction with grinding plate 24 and nozzle 28 and knife 34, a continuous pattie forming process is provided for what has been heretofore a difficult process to automate in the fast frozen food industry. In particular, waste has been substantially eliminated, cavitation and spoilage within the product has been overcome and a tendered, juicier product for a given quality of raw food is provided at less cost than heretofore possible. It should be appreciated that while a food pump 12 has been illustrated in the embodiment of the present invention, conventional griding plates and augers may also be used with the nozzle 28 where a discontinuous process is acceptable.

There follows examples of the use of the invention in making various types of meat patties.

EXAMPLE I

| | |
|---|---|
| Meat | natural raw frozen chipped steer beef, no additives, less than 30% fat. |
| Aperture plate 24 | thickness - ¼ inch |
| | number of apertures about 90 |
| | diameter of apertues 0.156 inches |
| Nozzle 28 | a) inlet opening - 2¾ inches |
| | b) axial length (direction 58) - about 1¾ inches |
| | c) exit opening - transverse diameter (round) - 1¼ inches |
| Power Source | Hobart Laboratory Grinder |
| | 1725 RPM, ¼ H.P. motor |
| | Conventional screw type auger |
| Pattie Thickness | ⅜ to 1 inch |

EXAMPLE II

| | |
|---|---|
| Meat | natural raw frozen chipped steer beef, no additives, less than 30% fat |
| Aperture plate 24 | thickness - ¼ inch |
| | number of apertures - about 60 |
| | diameter of apertures - 0.156 inches |
| Nozzle 28 | a) inlet opening - 2¾ inches transverse diameter (round) |
| | b) axial length (direction 58) - about 1¾ inches |
| | c) exit opening - 1.1 × 1.1 inches (square) |
| Power Source | Hobart Laboratory Grinder |
| | 1727 RPM, ¼ H.P. motor |
| | Conventional screw type auger |
| Pattie Thickness | ⅜ to 1 inch |

EXAMPLE III

| | |
|---|---|
| Meat | natural raw frozen chipped steer beef and veal, no additives, less than 30% fat, separately processed to form beef and veal patties. |
| Aperture plate 24 | thickness - ¼ inch |
| | number of apertures - about 596 |
| | diameter of apertures - 0.187 inches |
| Nozzle 28 | a) inlet opening - 5 inches |
| | b) axial length (direction 58) - about 5 inches |
| | c) exit opening - about 4⅝ × 3 9/16 inches (rectangular) |
| | d) axial length of portion 44 - about 2 inches |
| Power Source | 15 H.P., variable speed pump |
| Pattie Thickness | ⅜ inch to 1 inch |

EXAMPLE IV

| | |
|---|---|
| Meat - | raw frozen chipped steer beef with bread crumbs, dried onions, dried eggs and salt added. |
| Aperture plate 24 - | thickness - ¼ inch |
| | number of apertures - about 815 |
| | diameter of apertures - 0.187 inches |
| Nozzle 28 - | a) inlet opening - 7⅞ inches transverse diameter (round) |
| | b) axial length (direction 58) - about 3 inches |
| | c) exit opening - 4 × 5⅝ inches |
| | d) axial length portion 44 about 2 inches |
| Power Source - | 60 H.P., variable speed - conventional screw type auger |
| Pattie Thickness - | ⅜ inch to meat loaf proportions (various lengths). |

What is claimed is:

1. An extrusion nozzle for use with a meat grinder, said grinder including a grinding plate having a plurality of spaced apertures extending in a first direction, said plate including said apertures having a first area transverse said first direction, solely said apertures having a second area transverse said first direction less than said first area, said nozzle comprising:
   a housing having a hollow core tapered in a second direction from a wider inlet port to a narrower portion disposed within said housing, said narrower portion extending to a discharge port, said inlet port having an area transverse said second direction of at least the same magnitude as said first area, said narrower portion having an area transverse said second direction of about the same magnitude as said second area, and
   means secured to said housing for coupling said inlet port adjacent said grinding plate.

2. In an apparatus for use with a meat grinder, the combination comprising:
   a grinding head having a plurality of spaced apertures extending through said head in a first direction, said head including said apertures having a first area transverse said first direction, solely said apertures having a combined second area transverse said first direction smaller than said first area,
   a nozzle having a hollow core tapered in a second direction from a wider inlet port to a narrower portion disposed within said nozzle, said narrower portion extending within said nozzle to a discharge port, said inlet port having an area transverse said second direction of at least the same magnitude as said first area, said narrower portion having an area transverse said second direction of about the same magnitude as said second area to cohesively gather the ground meat when forced through said apertures toward said discharge port, and
   means for coupling said inlet port adjacent said apertures such that meat forced through said apertures is forced into said nozzle at said inlet port.

3. In combination:
   meat extruding means, said extruding means having an inlet port and an outlet port,
   a grinding plate coupled to said outlet port, said plate having a plurality of spaced apertures extending through the plate in a first direction, said plate including said apertures having a first area transverse said first direction, solely said apertures having a combined second area transverse said first direction smaller than said first area,
   a nozzle having a hollow core tapered in a second direction from a wider inlet port to a narrower portion disposed within said nozzle, said narrow portion extending within said nozzle to a discharge port, said nozzle inlet port having a maximum area transverse said second direction of at least the same magnitude as said first area, said narrow portion having a minimum area transverse said second direction of about the same magnitude as said second area, and
   means for coupling said grinding plate adjacent said extruding means outlet port and for coupling said nozzle adjacent said grinding plate such that said meat is forced through said grinding plate to said nozzle.

4. The combination of claim 3 further including a rotating knife disposed adjacent said nozzle discharge port, and means for rotatably mounting said knife.

5. The combination of claim 4 wherein said knife has an involute cutting edge.

6. The combination of claim 3 wherein said minimum area is about 5% greater than said second area.

7. The combination of claim 3 wherein said extruding means includes a pressure pump, said pump including a pump chamber and a drive means closely fitted within said chamber to prevent cavitation of said meat when driven by said drive means to said outlet port.

8. In combination:
   an extruding machine having a discharge port for extruding meat at a given uniform feed rate, said machine forming an elongated plastic mass of extruded meat at said discharge port,
   a rotating knife mounted on said machine adjacent said discharge port, said rotating knife having an involute cutting edge which edge slideably transverses said discharge port when said knife rotates for severing said plastic mass, said knife including a plastic mass receiving recess having a given depth disposed adjacent said cutting edge for receiving the end of said plastic mass during said extruding while said knife rotates, and
   mounting means for rotatably mounting said knife on said machine, said mounting means including means for rotating said knife in synchronism with said feed rate to thereby form uniform portions of said plastic mass during said extruding.

9. An extrusion device for use with a meat grinder, said grinder including a grinding plate having a plurality of spaced apertures extending in a first direction, said plate including said apertures having a first area transverse said first direction, solely said apertures having a second area transverse said first direction less than said first area, said device comprising:
   a nozzle having a tapered hollow core extending in a second direction from a wider inlet port to a narrow outlet port, said inlet port having an area transverse said second direction of at least the same magnitude as said first area, said outlet port having an area transverse said second direction of about the same magnitude as said second area,
   a conduit coupled to the outlet port of said nozzle, said conduit having a transverse area of about the same magnitude as said outlet port, said conduit having an inlet port coupled to said nozzle outlet port and a discharge port,
   cutting means disposed adjacent said conduit discharge port for severing said meat when forced through said conduit by said grinder,
   means for coupling said conduit to said nozzle and
   means for disposing said cutting means adjacent said conduit discharge port.

10. The device of claim 9 wherein said cutting means includes a rotating knife having an involute cutting edge.

11. The device of claim 10 wherein said knife has a meat receiving recess disposed along the blade of said knife to receive said forced meat prior to said severing.

12. Apparatus for producing meat patties, comprising, in combination:

meat extruding means, said extruding means having an inlet port, and an outlet port through which meat is extruded:

a grinding plate receptive of the extruded meat, said plate having a plurality of spaced apertures extending through the plate, solely said apertures having a given combined area;

a nozzle having a relatively large area inlet port positioned to receive the strands of meat forced through the grinding plate, and a hollow core which tapers from said inlet port to a relatively small area discharge port, said discharge port having a cross-sectional area approximately equal to said given combined area, whereby the strands of meat, when they exit the discharge port, form a cylinder in which the strands adhere to one another, but in which there are air pockets between the strands; and means for slicing meat patties from the cylinder formed of the strands, in a direction substantially transverse to the cylinder axis, at a point beyond the discharge port of the nozzle, the meat patties consisting of strands which adhere to one another and with the air pockets remaining between the strands.

* * * * *